Dec. 19, 1967 N. J. GRIFFITH 3,359,565

OSCILLOGRAPH STYLUS AND SUPPORT ARM THEREFOR

Filed Sept. 30, 1966 2 Sheets-Sheet 1

INVENTOR.
NEIL JOHN GRIFFITH
BY
Christie, Parker & Hale
ATTORNEYS

Dec. 19, 1967 N. J. GRIFFITH 3,359,565

OSCILLOGRAPH STYLUS AND SUPPORT ARM THEREFOR

Filed Sept. 30, 1966 2 Sheets-Sheet 2

INVENTOR.
NEIL JOHN GRIFFITH

BY Christie, Parker & Hale
ATTORNEYS 3,359,565
Patented Dec. 19, 1967

3,359,565
OSCILLOGRAPH STYLUS AND SUPPORT ARM THEREFOR

Neil John Griffith, Arcadia, Calif., assignor to Consolidated Electrodynamics Corporation, Pasadena, Calif., a corporation of California Filed Sept. 30, 1966, Ser. No. 583,347
7 Claims. (Cl. 346—139)

ABSTRACT OF THE DISCLOSURE

A stylus for a heat-writing recording oscillograph in which two concentric tubes of electrically conductive material having high resistivity and high strength at elevated temperatures are insulatively mounted relative to each other along their length, except at one end of the pair of tubes, by a material having a coefficient of thermal expansion substantially equal to that of the tubes. A stylus heating potential is applied across the other ends of the tubes which are mounted in cantilever fashion to a support.

This invention relates to recording oscillographs and particularly to apparatus for heat writing on thermosensitive recording media.

A recording oscillograph is a device for producing upon a record medium a graphic representation, as a function of time, of the instantaneous values of one or more signals applied as inputs to the device. The type of recording oscillograph with which the present invention is concerned is commonly known as a strip chart recorder. The record material is a strip of paper which is specially prepared to be thermally sensitive. The desired graphic representation is produced on the moving strip of paper by moving a heated stylus transversely of the path of movement of the paper in response to the values of a signal applied to the recorder.

In the recording of signals which vary in value at relatively high frequencies, the velocity of stylus relative to the record becomes high. The stylus should move faithfully across the record in response to input signal variations. As a result, low mass of the stylus and its support mechanism is desired, or else the stylus drive mechanism becomes costly and massive. Further, portability of a strip chart recorder is desired and in this regard light weight in the stylus and its support arm is beneficial.

Where high writing speeds are incurred, the temperature lag of the heated stylus must be minimized. The temperature of the stylus should be kept as low as possible so as not to cause the record to burn out at low velocities of the stylus relative to the record. However, the stylus should be sufficiently hot to write effectively at high writing speeds. Further, the maximum temperature of the stylus is limited by the structure and method of mounting the stylus to a support arm. The stylus should conduct, convect and radiate minimum heat to ambient conditions. To prevent thermal lag in the stylus, the stylus should be defined by a minimum quantity of material having a high heat of fusion to provide maximum power dissipation at zero stylus velocity.

The stylus and its supporting arm must withstand up to 1,000 G's acceleration and must resist bending or torsion in the writing plane of the recorder. The support arm must be stiff in a plane normal to the writing plane to prevent skipping of the stylus relative to the record medium, yet the stylus support arm must flex to allow the stylus to be lifted for record medium loading. The arm resonent frequency must exceed the greatest frequency of the signal applied to the device, i.e., the resonant frequency of the support arm must be well above about 500 cycles per second.

The present invention provides an improved stylus and stylus mounting arm for a heat-writing strip chart recorder. The stylus and its support arm have low mass and are rugged and rigid. As a result, the mechanism is capable of faithful response at high input signal frequencies. Minimum temperature lag is a characteristic of the stylus. The low mass and high stiffness of the support arm produces a high resonant frequency for the arm.

Generally speaking, this invention provides a stylus for a heat-writing recording oscillograph and the like. The stylus includes first and second concentric tubes fabricated of electrically conductive material having high resistivity and high strength at elevated temperatures. Electrically nonconductive insulation means are disposed between the tubes for nonconductively mounting the tubes to each other. The insulation means has a coefficient of thermal expansion substantially equal to the coefficient of thermal expansion of the tubes. The tubes are conductively interconnected at one end of the pair of tubes. Also, the stylus includes means which mount the pair of tubes in cantilever fashion at the other end of the pair. Further, electrical connector means are connected to each tube at a location spaced along the tube from the interconnected ends of the tubes for electrically energizing the tubes thereby to heat the stylus.

The above-mentioned and other features of the present invention are more fully set forth in the following detailed description of a present embodiment thereof, the following description being presented with reference to the accompanying drawings, wherein.

Figure 1:
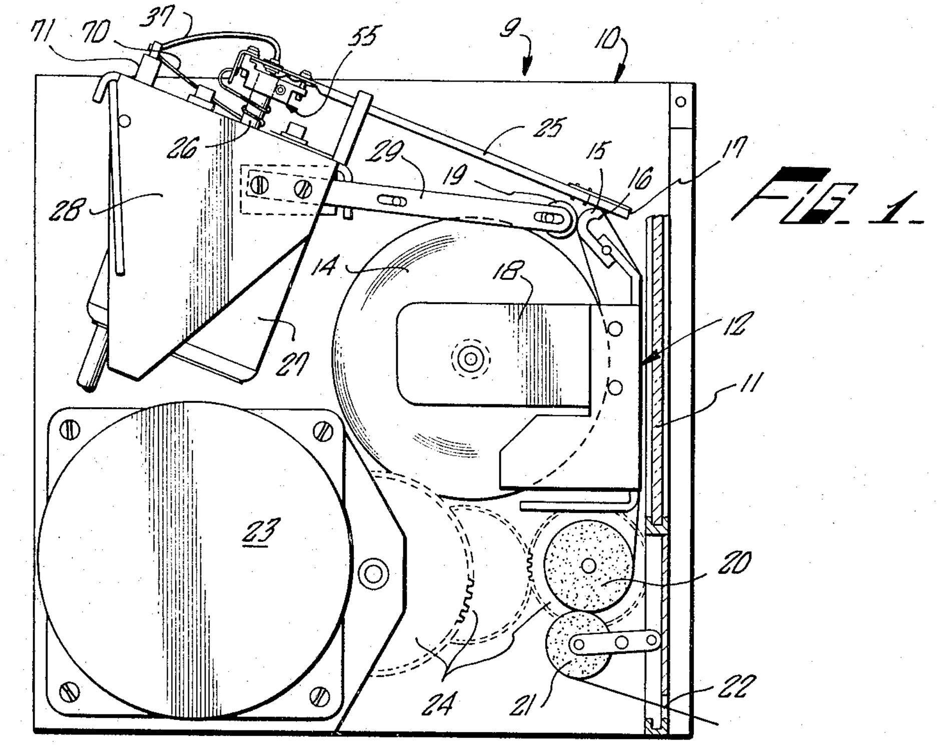
FIG. 1 is a side elevation view of a heat-writing recording oscillograph.

A recording oscillograph 9, also known as a heat-writing strip chart recorder, shown in FIG. 1, includes a housing frame 10, an openable front door 11 hinged to the frame, and a platen 12 past which a length of thermosensitive recording paper 13 is passed from a supply roll 14. A writing edge member 15 extends transversely of the path of movement of the record paper across the upper end of the platen and defines a sharp writing edge 16 over which the paper is drawn under a heated writing stylus 17. The engagement of the heated stylus with the thermally sensitive record paper causes the generation on the paper of a line which contrasts from the color of the paper in areas not engaged by the heated stylus.

Record supply roll 14 is mounted between a pair of support arms 18 which extend rearwardly from the platen. After leaving the roll, the record paper is passed between a rotatable drag roller 19 and the writing edge member, over the writing edge itself below the heated stylus, over the face of the platen adjacent door 11, between a drive roller 20 and an idler roller 21 resiliently biased toward the drive roller, and thence through an opening 22 in the lower portion of door 11 to the exterior of the oscillograph housing. Rotation of the drive roller is provided by a record transport drive motor 23 and a drive gear train 24 coupled between the motor and the drive roller.

Stylus 17 is mounted to the unsupported end of a stylus support arm 25, the opposite end of the support arm being mounted in cantilever fashion to the rotatable output shaft 26 of a stylus drive motor 27. The stylus drive motor is mounted to a support plate 28 and is located in the upper rear portion of the oscillograph housing. If the oscillograph includes more than one stylus, then each stylus is mounted by an appropriate support arm to its own drive motor.

Figure 2:
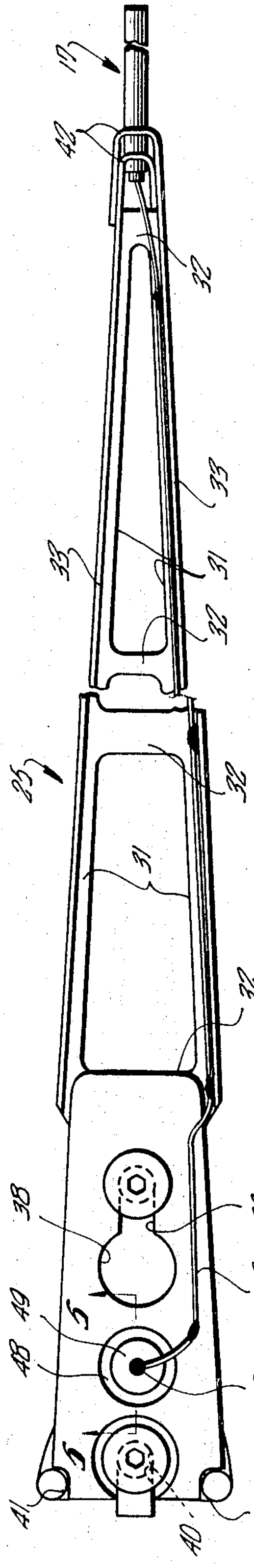
FIG. 2 is a bottom plan view of a stylus arm and stylus according to this invention.
Figures 3, 4:
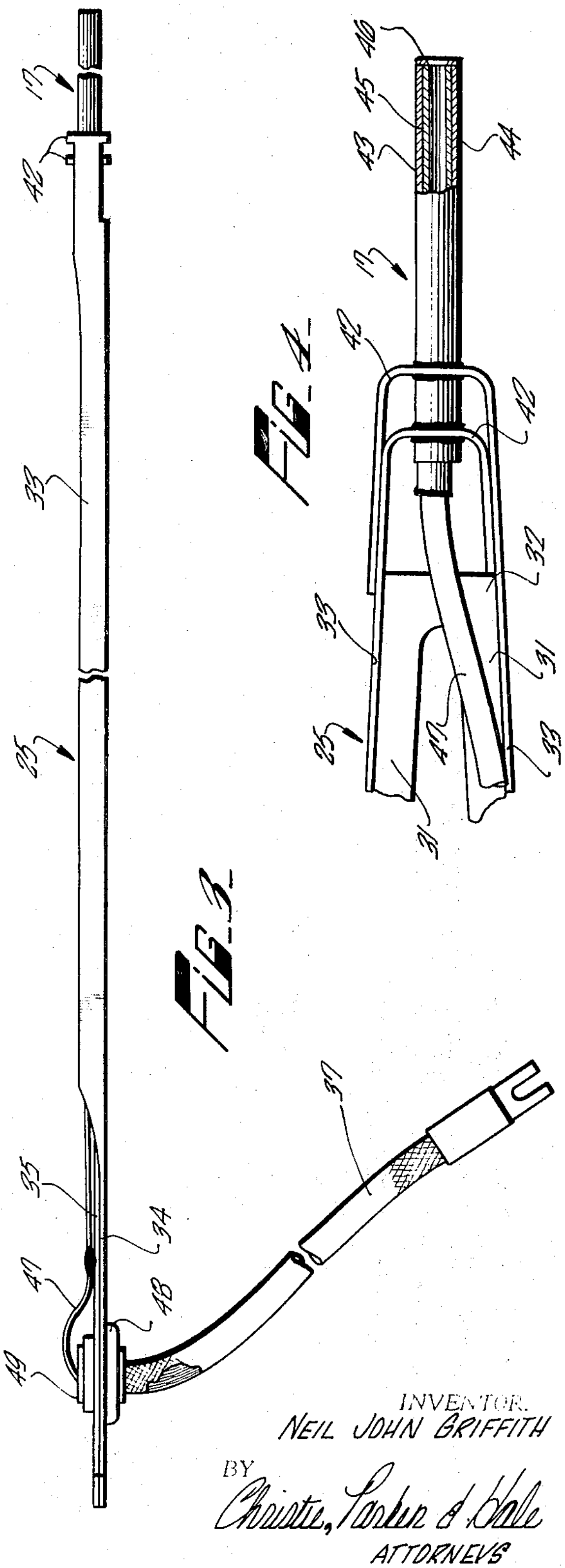
FIG. 3 is a side elevation view of the support arm and stylus shown in FIG. 1, the stylus being shown upside-down in FIG. 3.
FIG. 4 is an enlarged bottom plan view of the stylus, shown partially in cross section, and the adjacent portion of its support arm.

As shown in FIGS. 2 and 3, stylus support arm 25 comprises a unitary, elongate, substantially planar arm member having a pair of spaced planar column portions 31 extending along a major portion of the length of the arm. The column portions are arranged in a common plane and converge toward, but do not intersect, each other along the length of the support arm. A plurality of truss portions 32 extend integrally between the column portion in the common plane of the column portions at the opposite ends of the column portions and at spaced apart locations between the opposite ends of the column portions. Each column portion has a flange 33 formed integral therewith and extended out of the common plane of the column portions. Each flange extends along the length of its column portion and beyond the ends of the arm at which the column portions are most proximate to each other. Each flange is located along the edge of its column portion which is opposite from the other column portion. At the end of the arm at which the column portions are spaced farthest from each other, an elongate extension portion 34 is defined by the support arm. A doubler member 35 overlies and is secured to the extension portion and conforms to the configuration of the extension portion.

The support arm is made from thin sheet metal, preferably one-half hard #301 stainless steel having a thickness of about 0.006 inch. Accordingly, a very lightweight, rigid structural support for stylus 17 is provided by the support arm.

Figures 5, 6, 7:
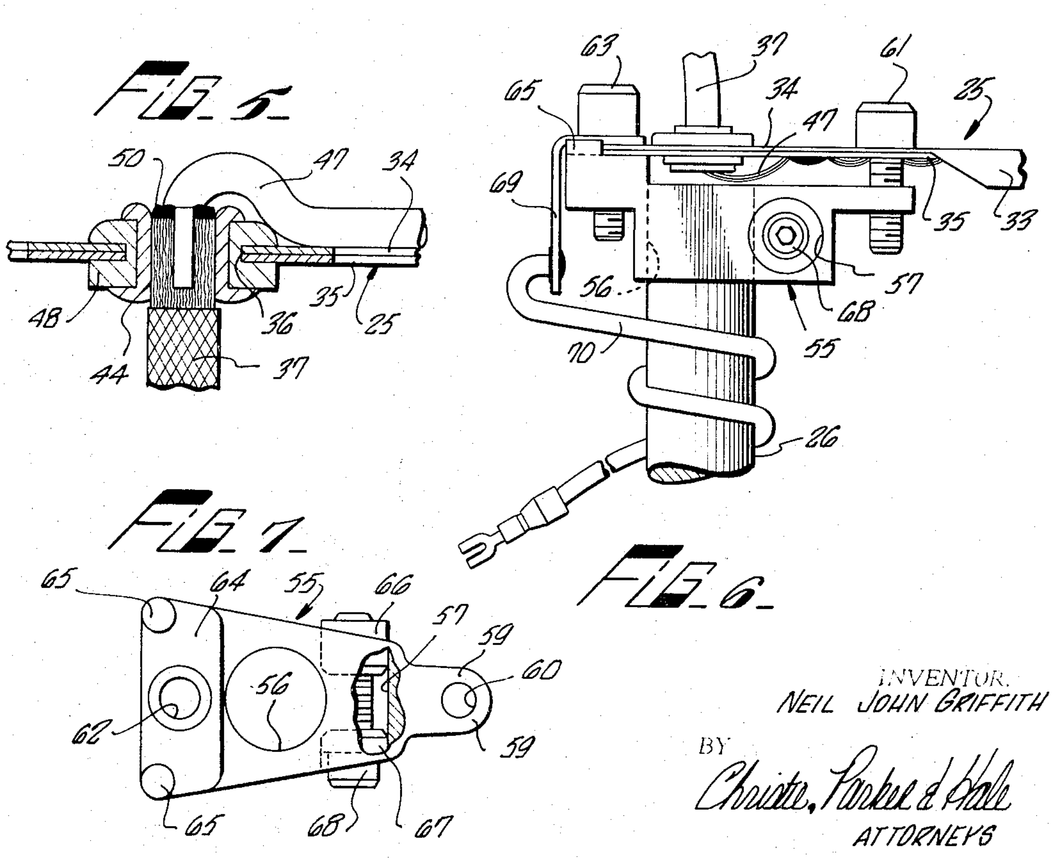
FIG. 5 is an enlarged cross-sectional elevation view taken along line 5—5 of FIG. 2.
FIG. 6 is an enlarged elevation view of the mounting of the stylus arm to the stylus drive motor shaft.
FIG. 7 is a top plan view of the hub which connects the stylus support arm to the drive motor shaft.

As shown best in FIGS. 2 and 5, an aperture 36 is provided through the support arm, i.e., through the extension portion and the double member, at a location on the longitudinal center line of the arm at the end of the arm opposite from stylus 17. This aperture is provided for mounting to the support arm a stylus energization lead-in conductor cable 37. Also located along the longitudinal center line of the support arm between aperture 35 and adjacent truss portion 32 is a keyhole aperture 38 having a slot extension portion 39 extended toward the stylus. A slot 40 is formed through the arm toward aperture 36 along the longitudinal center line of the arm from the end of the arm opposite from the stylus. The corners of the arm adjacent slot 40 are notched as at 41.

As mentioned above, column portion flanges 33 extend at 42 beyond the converging ends of the column portions. These flange extensions cooperate to define means for mounting stylus 17 to the support arm. As illustrated in FIG. 4, each flange extension 42 is formed into a return-bend configuration concave toward the arm proper and is interconnected with the opposite flange. The bases of the flange return-bend configurations are spaced parallel to each other.

Also as illustrated in FIG. 4, stylus 17 is comprised of a pair of concentric, thin-walled metal tubes 43 and 44. The tubes preferably are made of a metal which has high resistivity and high heat of fusion, resists oxidation, and has a high structural strength at temperatures in the vicinity of 1000° C. and higher. In a presently preferred embodiment of the invention, the stylus tubes are made of Hastelloy C. When the recorder is in use, the stylus is heated to yellow incandescence.

A thin film of electrical insulation material 45 is provided between tubes 43 and 44 to nonconductively mount the tubes to each other. The insulation material preferably has a thermal coefficient of expansion which is substantially equal to the thermal coefficient of expansion of tubes 43 and 44. Preferably, the insulation material is a ceramic composition composed of National Bureau of Standards 418 coating and 15% Alundum. The thinness of the insulative coating between the tubes minimizes thermal lag in the stylus, but provides adequate electrical insulation between the tubes.

The tube assembly, as shown in FIG. 4, is passed through the return bend of portions of flanges 33 and is welded to the base portions of the flange extension return-bend configurations. Accordingly, the stylus is rigidly supported in a cantilever fashion from the end of support arm 25. The unsupported ends of tubes 43 and 44 are aligned and are conductively interconnected as by welding 46.

Preferably, the outer tube of the tube pair (tube 43) is welded to flange extensions 42. As a result, an electrically conductive connection exists between support arm 25 and tube 43 so that the stylus arm provides a return path for current supplied to the stylus for heating the stylus. A single conductor wire 47, coated with ceramic insulation, is conductively secured to tube 44 for supplying energizing current to the stylus. The opposite end of conductor 47 is secured to lead-in cable 37 in the manner illustrated in FIG. 5. The energizing current applied to the stylus is about 5 amperes direct current. The stylus resistance is about 0.37 ohm. The normal maximum range of stylus operating temperatures is about 1025° C.

Aperture 36 through support arm extension 34 and doubler member 35 is rimmed with a grommet 48. The circumferential insulation of cable 37 is removed from the cable for a short distance adjacent its end. The exposed conductors of the cable are bonded within an annular insulative sleeve 49 which is engaged within and supported by the grommet. The insulation of conductor 47 is also removed from around the conductor at the end of the conductor opposite from stylus 17. The exposed portion of conductor 47 is forced into the bundle of conductors of cable 37 within sleeve 49 and secured to the cable conductors by solder 50.

As shown in FIGS. 6 and 7, stylus support arm 25 is secured to drive motor shaft 26 by a hub member 55. The hub member is provided with a drilled-through hole 56 within which the upper end of shaft motor 26 is received. A hole 57 is formed through the hub member and has its center line normal to the center line of hole 56. Hole 57 is located so as to tangentially intersect hole 56. A threaded hole 60, slightly undersized relative to the shank of screw 61, is formed through the hub along the length of the slot parallel to hole 56 and receives a stylus pressure adjusting screw 61. The threads of hole 60 have a slightly different pitch than the threads defined by screw 61. Preferably, screw 61 is made of a somewhat deformable nonconductive material such as nylon. A second threaded hole 62, for receiving a second support arm fastening screw 63, is formed in the hub parallel to hole 60 on the side of hole 56 opposite from hole 60. Hole 62 is formed in a land portion 64 which is raised above the remainder of the hub element, as illustrated in FIG. 6. A pair of locating pegs 65 extend above the land at the rear corners of the hub for cooperation with notches 41 in the support arm to properly locate the support arm relative to the hub element.

The hub element is secured to motor shaft 26 by a pair of collets 66 and 67 in cooperation with a screw 68 located in hole 57, as shown in FIG. 7. The outer diameter of the collets is only slightly less than the diameter of hole 57. Collet 67 is unthreaded, whereas collet 66 is threaded to cooperate with the threads of screw 68; collet 67 abuts the head of screw 68. To secure the hub to the motor shaft, the shaft is engaged in hole 56 and screw 68 is turned relative to collet 66 to draw the collets together until the collets engage the portion of the motor shaft which lies within the confines of hole 57. In this manner, the hub is secured from angular movement relative to the motor shaft.

The widths of slot extension 39 and slot 40 are slightly greater than the diameters of the shanks of screws 61 and 63, respectively. The stylus support arm is secured to hub 55 by passing the head of screw 61 through keyhole aperture 38, and then sliding the support arm toward motor shaft 26 so that the shanks of screws 61 and 63 are engaged in slots 39 and 40, respectively. When arm notches 41 abut locating pegs 65, the arm is in its proper position relative to the hub. One end of conductive lug 69 is engaged between the upper surface of the support arm and the head of screw 63; a ground conductor cable 70 is secured to the other end of the lug member and is wrapped at least one full turn around motor shaft 26 below the hub element. The arm is engaged with the hub so that arm flanges 33 depend from the arm and so that stylus energization cable 37 extends upwardly from the arm.

After the arm has been properly engaged with the hub element in the manner described and as shown in FIG. 6, screw 63 is tightened relative to the hub to clamp the rear end of support arm 25 securely to the hub element. Screw 61 is adjusted against the cantilevered resilient bias of the arm relative to the hub element so that the desired pressure of stylus 17 against writing edge member 15 is provided. The differential pitch between the threads of screw 61 and hole 60 assures that screw 61 will not be moved out of adjustment relative to the hub element during operation of the recorder.

It will be observed from FIG. 6 that when the stylus support arm is properly positioned relative to hub element 55, stylus energization cable 37 is located coaxially of shaft 26. Accordingly, as the shaft oscillates angularly during operation of the recorder, cable 37 is subjected only to torsion, rather than bending. Accordingly, the useful life of the cable is maintained at an optimum level. Also, the coaxial connection of the energization conductor to the stylus support arm minimizes recording hysteresis during operation of the recorder. The ends of cables 37 and 70 remote from the hub element are connected to hot and ground terminals, respectively, of a stylus power supply terminal block 71 located on drive motor mounting plate 28 to the rear of motor shaft 26, as shown in FIG. 1.

In recorder 9, the writing plane of the recorder may be defined as that plane which includes writing edge 16 and which is normal to the axis of drive motor shaft 26. Stylus support arm 25 is mounted so that column portions 31 of the arm lie in a plane parallel to the writing plane. During operation of the recorder, column portions 31 of the support arm are either in pure tension or compression load. Truss portions 32 of the support arm increase the effective column strength of column portions 31 by reducing the effective lengths of the column portions to provide an extremely simple and lightweight structure having great rigidity and strength. The flanges of the support arm impart to the arm sufficient stiffness that the arm cannot deflect from its normal plane during operation of the recorder in response to vibration and the like. Also, the provision of truss portions 32 intermediate the ends of the column portions results in a high resonant frequency of the support arm. As a result, the support arm is sufficiently rigid to remain on writing edge 16 even though the actual force of contact of the stylus with the writing edge may be very low. Even if the stylus should happen to skip relative to the writing edge, it will do so at a high frequency and the degradation of the recorded signal trace on record paper 13 is minimized.

The bridge-type construction provided by flange extensions 42 for mounting the stylus to the support arm provides excellent structural support for the stylus with a minimum of contact cross-sectional area between the stylus and the support arm. Since the stylus arm can convect large quantities of heat to ambient conditions during high frequency operation of the recorder, the tip-to-arm cross-sectional area is kept small to minimize conduction heat losses to the stylus arm. The construction described above also permits a thermal expansion differential between the stylus arm material and the stylus tip itself.

The above-described connection of the stylus support arm to hub element 55 permits easy replacement of a stylus. Also, the stylus-to-record-paper force adjustment is provided in a simple and effective manner. The hub itself has a very low inertia and the collet clamping arrangement of the hub to stylus motor drive shaft permits positive shaft gripping and alignment.

Because the stylus itself has a cylindrical configuration and cooperates with the record paper as the paper passes over a sharp edge defined by writing edge member 16, essentially point contact is provided between the stylus and the record medium. As a result, a fine trace is provided on the record medium as the recorder is operated. Because a minimum of material is used in constructing the stylus, the stylus has a low thermal lag. Thus, the temperature of the stylus during a high frequency operation of the recorder is maintained essentially constant with the result that the density of the trace formed on the record medium is maintained uniform.

The center of mass of the combination of hub 55, arm 25 and stylus 17 is close to the axis of motor shaft 26. This means that the moment developed in this structure during operation of the recorder is low, and the stylus moves faithfully across the writing edge in response to operation of motor 27, even during high frequency operation of the recorder.

What is claimed is:

1. A stylus for a heat-writing recording oscillograph and the like comprising a pair of concentric tubular elements fabricated of electrically conductive material having high resistivity and high strength at elevated temperatures, electrically nonconductive insulation means disposed between the tubular elements for nonconductively mounting the elements to each other, the insulation means having a coefficient of thermal expansion substantially equal to the coefficient of thermal expansion of the tubular elements, means conductively interconnecting the tubular elements at one end of the pair, means mounting the tubular elements in cantilever fashion at the other end of said pair, and electrical conductor means connected to each element at a location therealong spaced from said one end of the pair for electrically energizing the tubular elements for heating the same.

2. A stylus according to claim 1 wherein the insulation means is a thin layer of ceramic material disposed between the tubular elements.

3. A support arm for a writing stylus in a recording oscillograph comprising a unitary elongate substantially planar arm member having a pair of spaced planar column portions extending along a major portion of the length of the arm and arranged in a common plane to converge toward each other toward one end of the arm, a plurality of truss portions in said common plane interconnecting the column portions at the opposite ends thereof and at spaced locations between the ends of the column portions, a stiffening flange formed integral with each column portion along the edge thereof opposite from the other column portion and extending out of said common plane, means at the other end of the arm for mounting the arm to means for angularly oscillating the arm in said common plane, and means at the one end of the arm for mounting a writing stylus to the arm, the stylus mounting means comprising extensions of the flanges beyond the respective column portions at the one end of the arm, each extension being formed into a return-bend configuration concave toward the other end of the arm and secured at its end opposite from its corresponding column portion to the other flange, the flange extensions intermediate the return-bend configurations being spaced from each other.

4. A stylus support arm according to claim 3 including a heatable stylus mounted in cantilever fashion to said one end of the arm and extending from the arm parallel to said common plane.

5. A stylus support arm according to claim 4 wherein the stylus comprises a pair of concentric tubes fabricated of electrically conductive material having high resistivity and high strength at temperatures in the neighborhood of 1000° C., electrically nonconductive insulation means disposed between the tubes for nonconductively mounting the tubes to each other, the insulation means having a coefficient of thermal expansion substantially equal to the coefficient of thermal expansion of the tubes, means conductively interconnecting the tubes at one end of the pair of tubes, and electrical conductor means connected to each tube at a location therealong spaced from said one end of the pair for electrically energizing the tubes for heating the same.

6. A stylus support arm and stylus according to claim 5 wherein the pair of tubes are secured to the spaced portions of said arm flange return-bend configurations.

7. A stylus support arm and stylus according to claim 5 wherein the electrical conductor means includes an insulated conductive wire extending along the arm and conductively connected to the inner one of said pair of tubes for supplying energizing current to the stylus, and a conductive current return path defined by the outer one of the tubes and the arm.

References Cited

UNITED STATES PATENTS 3,163,491 12/1964 Daigler ------------- 346—140

RICHARD B. WILKINSON, *Primary Examiner.*

E. C. SIMMONS, *Assistant Examiner.*